UNITED STATES PATENT OFFICE.

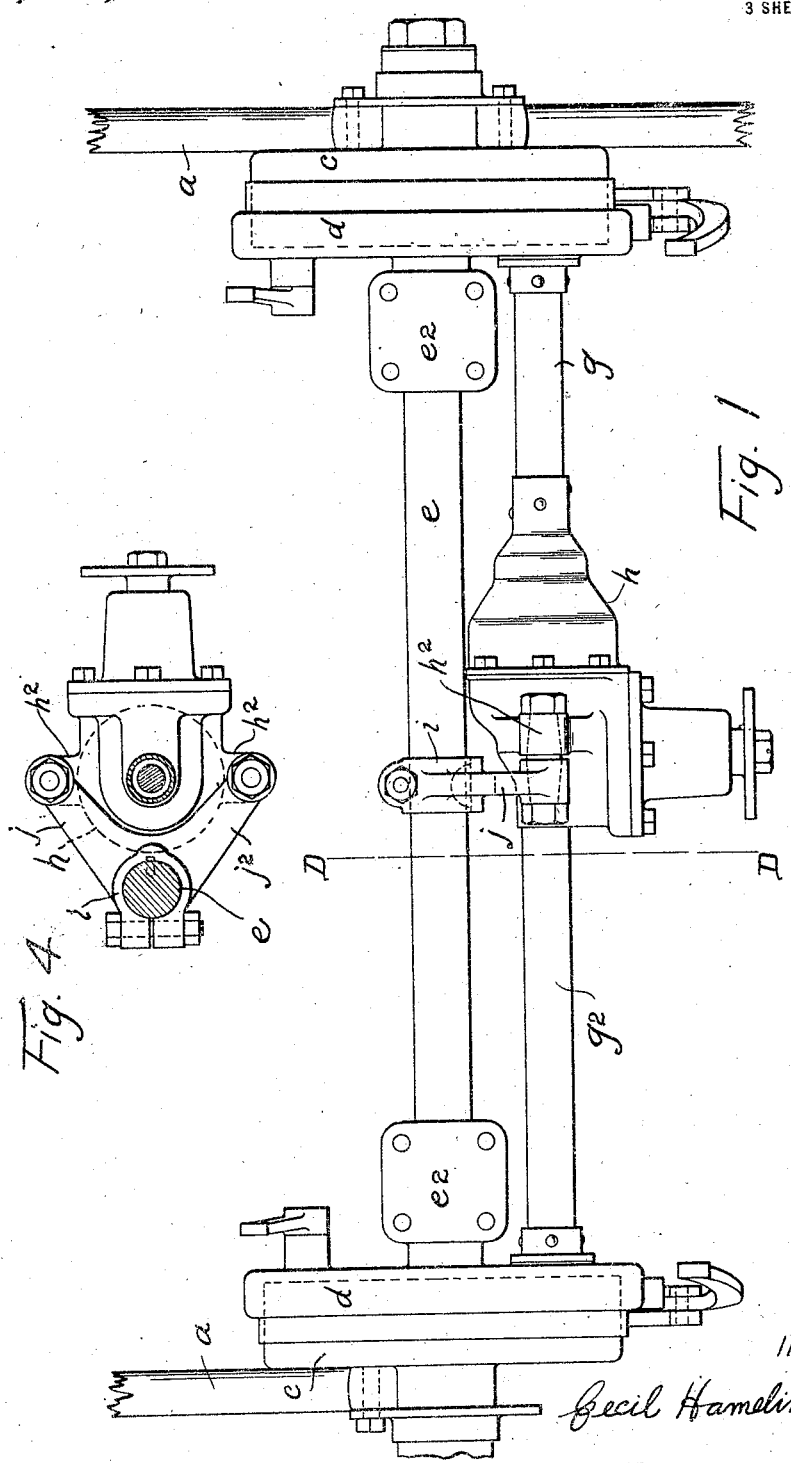

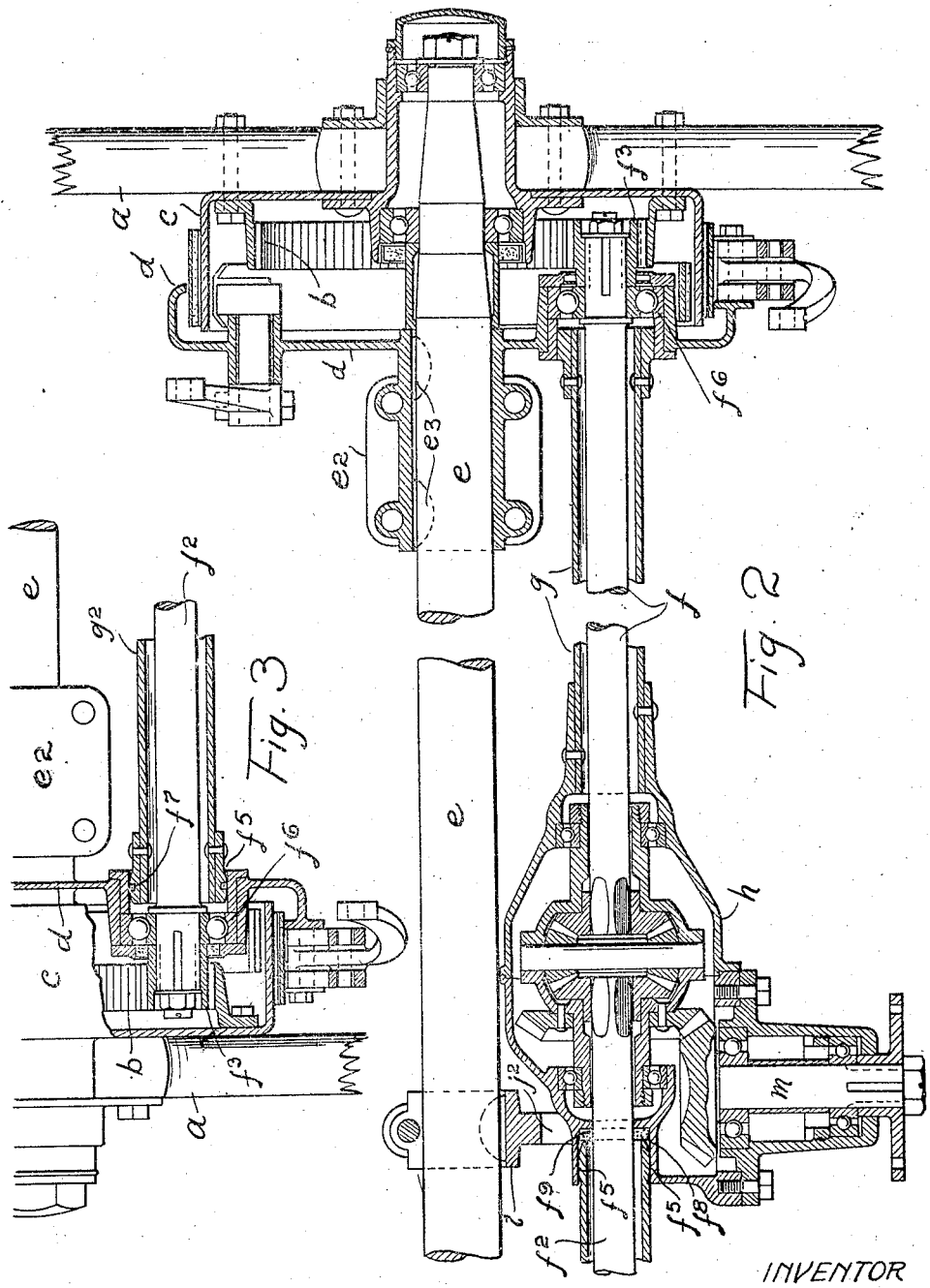

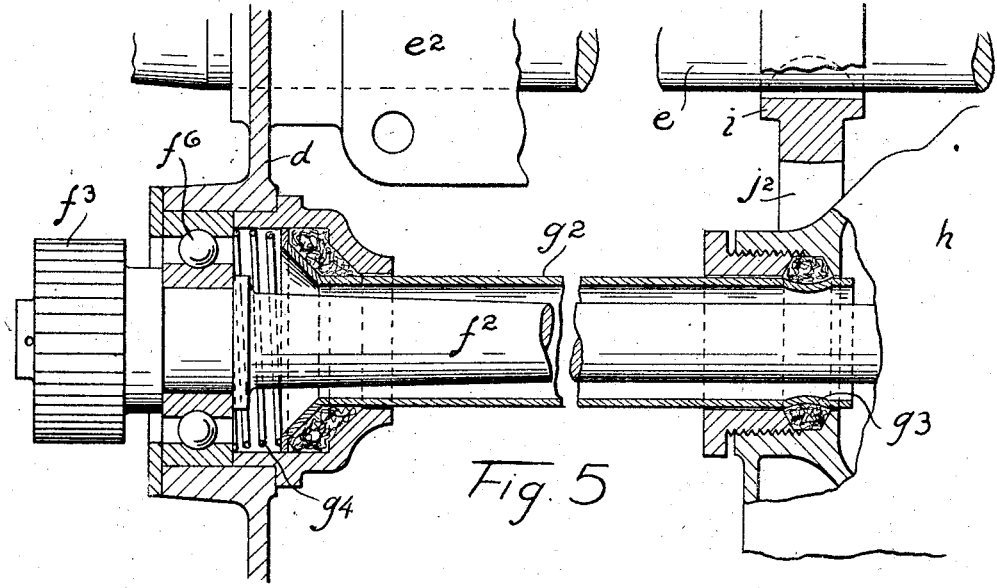
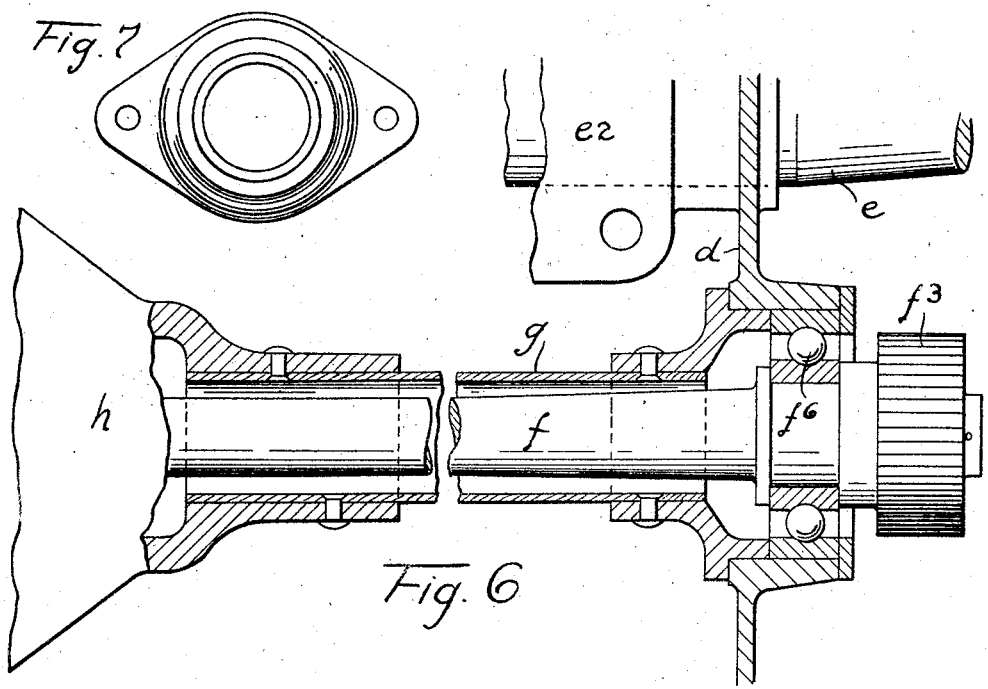

CECIL HAMELIN TAYLOR, OF DETROIT, MICHIGAN.

RUNNING-GEAR FOR AUTOMOBILES.

1,288,281.　　　　　Specification of Letters Patent.　　Patented Dec. 17, 1918.

Application filed April 7, 1916. Serial No. 89,512.

*To all whom it may concern:*

Be it known that I, CECIL HAMELIN TAYLOR, a citizen of the United States, residing at Detroit, county of Wayne, State of Michigan, have invented a certain new and useful Improvement in Running-Gears for Automobiles, and declare the following to be a full, clear, and exact description of the same, such as will enable others skilled in the art to which it pertains to make and use the same, reference being had to the accompanying drawings, which form a part of this specification.

My invention relates to automobiles and an object of my improvements is to provide an improved running gear and especially in reference to its adaptability to the warping of the chassis and resilient deformation of parts that occur in practice.

I secure this object in the device illustrated in the accompanying drawings in which, Figure 1 is a plan view of so much of an automobile running gear embodying my invention as is necessary to illustrate the same.

Fig. 2 is a plan view partly in section of the center and right hand portion of the part shown in Fig. 1, intermediate parts being broken away to economize space.

Fig. 3 is a sectional plan view of the part at the left of Fig. 1 omitted from Fig. 2.

Fig. 4 is a sectional elevation, the section being taken on the line D—D of Fig. 1, looking from the left of said line.

Fig. 5 is a detail sectional plan view showing the two ends of the shaft $f^2$ its casing and adjacent parts showing a modified construction, and Fig. 6 is a view similar to Fig. 5 showing a modified construction of the shaft $f$, its casing, and adjacent parts.

Fig. 7 is a detail.

$a\ a$ are the driving wheels, $b\ b$ internally toothed gear wheels secured to the driving wheels $a\ a$ concentric therewith. $c\ c$ is a casing secured to the wheels $a\ a$ extending over the gear wheel $b$. $e$ is the main axle upon the ends of which the wheels $a\ a$ turn. $e^2\ e^2$ are spring seats in which the axle $e$ is keyed as shown at $e^3$ Fig. 2. $d\ d$ are casings integral with the spring seats $e^2$ and extending over the casings $c$.

$f\ f^2$ is a divided counter shaft. The outer end of each part of said counter shaft rests in a ball bearing $f^6$ in a casing $d$ and its inner end bears in the differential gear casing $h$ and engages the differential mechanism therein in the usual way.

$f^3\ f^3$ are spur gear wheels upon the outer ends of the parts $f\ f^2$ of the divided counter shaft, engaging the internal teeth of the wheels $b$.

$g\ g^2$ are cylindrical casings covering the parts $f\ f^2$, respectively, of the counter shaft and $h$ is the differential gear casing. The casing $g$ is rigidly secured at one end to the differential casing $h$ and at the other end it engages a casing $d$. The casing $g^2$ engages in a socket in the differential casing $h$, as shown at $f^5$. The engaging end of the casing $g^2$ may be formed into a sphero-segmental shape as shown, so that there may be a little universal angular movement of the casing $g^2$ relative to the casing $h$.

There is a packing ring $f^9$ and a washer $f^8$ between the end of the casing $g^2$ and the differential casing $h$, as shown in Fig. 2. Or a stuffing box may be used at this place as shown in Fig. 5, in which case I form a depression or annular groove $g^3$ in the casing to receive the packing material.

The other end of the casing $g^2$ engages in a like manner in the casing $d$, as shown in Fig. 3. In this case I form a groove around the engaging end of the casing $g^2$ in which I put a strip of felt which makes a dust proof connection, as shown at $f^7$, Fig. 3, or, as shown in Fig. 5, I shape the outer end of the casing $g^2$ to form a gland and employ a spring $g^4$ to press the casing against the packing material to form a tight joint.

$i$ is a ring keyed and clamped to the axle $e$ at the center of said axle. $j\ j^2$ are resilient arms branching from the ring $i$ and engaging lugs $h^2\ h^2$ extending in opposite directions from the casing $h$. This construction forms an elastic attachment for the casing $h$ which permits of a resilient angular movement of said casing about an axis passing through its center at right angles to the axis of said casing.

$m$ is the transmission shaft engaging the differential gearing and bearing in the casing $h$ in the usual way. This shaft $m$ rests in bearings in an extension from the casing $h$. By this construction the casing $g\ h\ g^2$ may adapt itself to any warping of the chassis and axle or bending of the parts and at the same time the casing is adapted to receive the torque of the driving power and to hold the counter shaft firmly and strongly in an operative position.

The ring $i$ and arms $j$ $j$ constitute a bracket which will sustain the differential casing and its portion of the driving power, will permit the angular displacement of the casing as above described, and the casing $d$ in which the part $g$ of the counter shaft casing bears will also sustain its part of the driving force.

What I claim is:

1. In a transmission mechanism for vehicles, the combination of an axle, wheels on said axle, a divided counter shaft provided with a differential and having means engaging said wheels for driving the same, and a casing for said counter shaft wholly supported by said axle, said casing being flexible so as to provide for elastic displacement of said axle.

2. In a vehicle, a counter shaft, means for driving said shaft, a casing for said shaft, one part of said casing being supported near one side of the automobile and toward the center thereof, the means for driving said counter shaft having a bearing in said part of the casing, the other part of the casing being flexibly connected to the first named part at its inner end, and extending to the other side of the automobile.

3. In a vehicle, a counter shaft, means for driving said shaft, a casing for said shaft, one part of said casing being supported near one side of the vehicle and toward the center thereof, the means for driving said counter shaft having a bearing in said part of the casing, the other part of the casing being flexibly connected to the first named part at its inner end and flexibly supported at its outer end.

4. In a transmission mechanism for vehicles, a counter shaft consisting of two parts, a differential gearing adapted to actuate said parts at their adjacent ends, a casing for said differential mechanism, a casing for one part of said shaft secured to said differential gear casing at one end and secured at the other end, means for securing said casings in place, and a casing for the other part of said counter shaft flexibly connected to said differential casing.

5. In a transmission mechanism for vehicles, a counter shaft consisting of two parts, a differential gearing adapted to actuate said parts at their adjacent ends, a casing for said differential mechanism, a casing for one part of said shaft secured to said differential gear casing at one end and secured at the other end, means for securing said casings in place, and a casing for the other part of said counter shaft flexibly connected to said differential casing, and flexibly supported at its end remote from said differential gear casing.

6. In a transmission mechanism for vehicles, a divided shaft, a differential gearing located at the adjacent ends of the parts of said shaft and adapted to actuate said parts, a differential gear casing, means for supporting said differential gear casing wholly upon the axle, means bearing in said differential gear casing for actuating the divided shaft through the differential gearing and a flexible casing for a part of said shaft.

7. In a transmission gearing for vehicles, the combination of an axle, a counter shaft, a casing for said counter shaft, said casing being connected to said axle at three points and being provided with a flexible articulation to allow said casing to deflect with said axle.

8. In a vehicle, the combination of an axle, a counter shaft, a casing for said counter shaft, said casing being directly connected to the axle and solely supported thereby, the connection between said casing and axle being of such a construction as to permit relative angular movement.

9. In a transmission mechanism for vehicles, a counter-shaft, a driving shaft adapted to actuate said counter shaft and extending in a plane at right angles to said counter shaft, a member adapted to resist the torque of said driving shaft extending laterally and supported near its outer end, and a flexible shaft housing for said counter shaft extending in the opposite direction to said torque resisting member, and three or more supporting connections for said counter-shaft.

10. In a transmission mechanism for vehicles, a counter-shaft, a housing for said counter-shaft, a driving means producing a torque upon said housing in a plane at right angles to the length of the same and a support for said housing slightly flexible in the direction of the torque of said driving means.

In testimony whereof, I sign this specification.

CECIL HAMELIN TAYLOR.